United States Patent [19]

Lienemann et al.

[11] Patent Number: 4,744,316

[45] Date of Patent: May 17, 1988

[54] FURROW FORMING APPARATUS FOR A SEED PLANTER

[75] Inventors: Darlo E. Lienemann, Darien; Nicholas H. Wunschl, La Grange; Donald L. Ledermann, Darien, all of Ill.

[73] Assignee: J. I. Case Company, Racine, Wis.

[21] Appl. No.: 923,109

[22] Filed: Oct. 24, 1986

[51] Int. Cl.⁴ ............................................. A01C 5/06
[52] U.S. Cl. ...................................... 111/69; 111/87; 172/624.5; 292/175
[58] Field of Search ................... 111/52, 62, 63, 69, 111/83, 85, 87, 88; 172/307, 484, 624.5, 705; 292/175

[56] References Cited

U.S. PATENT DOCUMENTS

| | | | |
|---|---|---|---|
| 1,998,730 | 4/1935 | Moore | 292/175 |
| 2,180,253 | 11/1939 | Moore | 292/175 |
| 2,899,776 | 8/1959 | Arnold | 172/624.5 |
| 3,023,718 | 3/1962 | Sorensen et al. | 111/85 |
| 3,327,648 | 6/1967 | Patch | 292/175 |
| 3,749,035 | 7/1973 | Cayton et al. | 111/62 |
| 4,423,788 | 1/1984 | Robinson et al. | 111/88 |
| 4,425,857 | 1/1984 | Lienemann et al. | 111/66 |
| 4,461,355 | 7/1984 | Peterson et al. | 172/624.5 |

FOREIGN PATENT DOCUMENTS

| | | | |
|---|---|---|---|
| 255816 | 7/1967 | Austria | 172/307 |
| 155692 | 9/1985 | European Pat. Off. | 172/624.5 |

Primary Examiner—James R. Feyrer
Attorney, Agent, or Firm—Dressler, Goldsmith, Shore, Sutker & Milnamow, Ltd.

[57] ABSTRACT

An adjustable down pressure mechanism is disclosed for use in association with a furrow forming apparatus of a seed planter. A parallel linkage arrangement is provided for mounting the apparatus on a tool bar of a tractor or the like, whereby the apparatus can follow the contour of the ground for efficient and consistent furrow formation. The down pressure mechanism comprises one or more springs operatively extending between upper and lower links of the parallel linkage. An upper support member for the springs is configured for convenient adjustable positioning along the upper links, whereby the pressure exerted by the springs on the furrow forming apparatus can be readily varied.

1 Claim, 1 Drawing Sheet

U.S. Patent    May 17, 1988    4,744,316
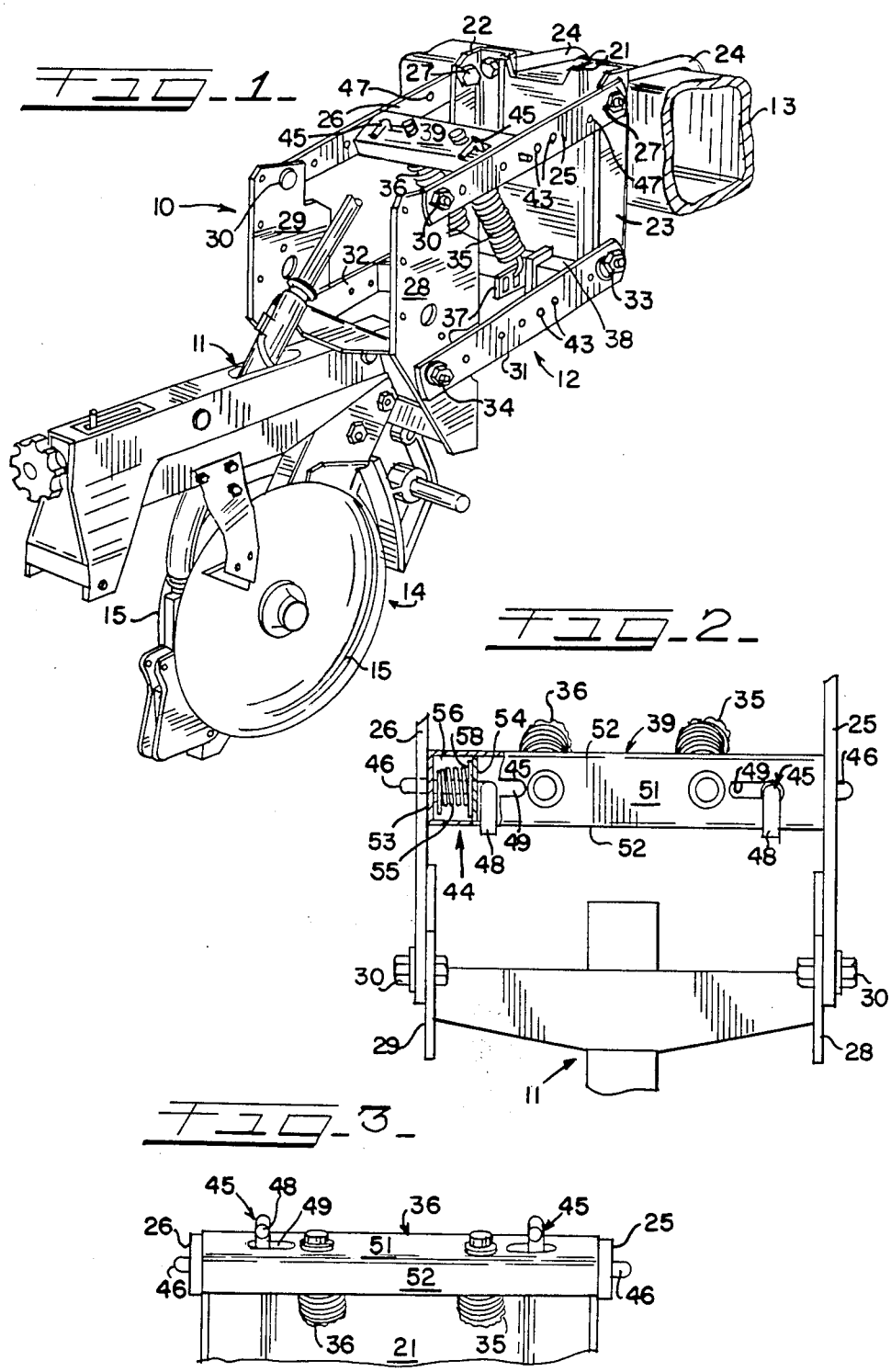

FURROW FORMING APPARATUS FOR A SEED PLANTER

TECHNICAL FIELD

This invention pertains generally to argicultural equipment and, more specifically, to a furrow forming implement for a seed planter or similar implement having a unique arrangement to vary the downward or upward pressure applied by the parallel support linkage of the planter.

BACKGROUND OF THE INVENTION

The efficient production of crops requires that seed planters meet certain primary design objectives which are: creating a furrow having an accurate planting depth and preferably providing soil having a reasonably high moisture content for early germination; accurate seed spacing; and seed to soil contact. This invention is primarily concerned with the furrow forming aspect of the planter.

A known seed planter utilizes a conventional pair of rotatably mounted, generally flat, disk openers that substantially contact each other where the disks enter the ground and diverge apart rearwardly and upwardly. The disks are supported on a frame which is connected to a tool bar of a mobile power source by a parallel support linkage so that the frame is maintained in a generally horizontal position parallel to the ground despite varying ground contours. A down-pressure spring arrangement extends between the upper and lower links of the parallel linkage. Depending upon the relative lever arms of the upper and lower links, the springs can apply varying amounts of upward or downward pressure to the linkage, and thereby decrease or increase the force applied to the disks to insure that they properly penetrate the soil.

To facilitate efficient furrow formation under different soil conditions, the present invention provides an arrangement which permits quick and easy adjustment of the aforementioned pressure without the use of any tools.

SUMMARY OF THE INVENTION

The furrow forming apparatus in accordance with the present invention includes a frame adapted to be attached to a tool bar of a mobile power source, with the frame having a furrow forming means rotatably mounted thereto. The frame is mounted on the tool bar by a parallel linkage which facilitates selective adjustment of the downward or upward pressure applied to the furrow forming means.

The parallel linkage includes a pair of transversely spaced, longitudinally extending upper links pivotably secured at first ends to the tool bar and at second ends to the frame, and a pair of transversely spaced, longitudinally extending lower links pivotably secured at first ends to the tool bar and at second ends to the frame. An upper support channel member transversely extends between the upper links and a lower support channel member transversely extends between the lower links. A down pressure spring means extends between the upper support channel and the lower support member to spring load the parallel linkage.

The upper support member is preferably defined by an upper wall, a pair of spaced side walls and a pair of spaced end walls. A pair of transverse partition walls respectively extend between the side walls parallel to each of the end walls, and are each spaced a short distance therefrom. A pair of plunger-like connecting pin members respectively extend outwardly through openings in each of the end walls of the upper support member. The pin members are respectively moveable between a first position extending into a selected one of the openings in the upper links and a second retracted position withdrawn from such openings.

The connecting pin members are spring biased toward their first positions by a respective spring means received about the connecting pin member and positioned between the respective partition wall and end wall. The spring means is sandwiched or held in captive relation between a first washer received about the connecting pin member and the partition wall. A retaining means is provided on the connecting pin member for movement of the first washer towards the partition wall against the bias of the spring means as the connecting pin member is moved from its first position towards its second retracted position.

In order to facilitate movement of the connecting pin members from their first positions toward their second positions, the connecting pin members are formed with handle portions which extend upwardly through elongated slots formed in the upper wall of the upper support member.

The lower support member may be provided with a pair of longitudinally spaced openings for selective receipt of the lower end of the down pressure spring means. A pair of spaced apart down pressure spring means is preferably provided between spaced locations on the upper support member and the lower support member.

Other features and advantages of the invention will be readily apparent from the following detailed description, accompanying drawings, and the appended claims.

BRIEF DESCRIPTION OF THE DRAWINGS

FIG. 1 is a perspective right side view of a seed planter implement incorporating the furrow forming apparatus in accordance with the invention;

FIG. 2 is an enlarged top plan view, partially broken away, of a portion of the mounting means of the furrow forming apparatus as shown in FIG. 1, and FIG. 3 is an end elevational view of the portion of the mounting means as shown in FIG. 2.

DESCRIPTION OF A PREFERRED EMBODIMENT

While the present invention is susceptible of embodiment in various forms, therein is disclosed herein a presently preferred embodiment of the invention, with the understanding that the present disclosure is to be taken as an exemplification of the invention.

Referring to FIG. 1, a furrow forming apparatus for a seed planter is indicated by the reference numeral 10. Apparatus 10 has a frame 11 and a mounting means 12 for attachment of the frame to a mobile power source, such as a tool bar 13 of a tractor, for towing.

As is well known in the art, the furrow forming apparatus includes a furrow forming arrangement 14 supported from frame 11. The arrangement includes a pair of rotatably mounted furrow forming discs 15 that substantially contact each other where they enter the ground and diverge apart rearwardly and upwardly. Although not shown, gauge wheels are typically provided and are pivotally supported on the frame rearward of the disks 15. An exemplary furrow forming arrangement is illustrated and disclosed in U.S. Pat. No. 4,356,780, which patent is assigned to the same assignee as the present invention.

The present invention is specifically directed to an improved arrangement for mounting the frame 11 to a tool bar 13 to facilitate selective adjustment of downward or upward pressure exerted on the furrow forming arrangement 11 to thereby increase or decrease the force applied to the disks 15 to insure that they properly penetrate the soil for furrow formation.

Referring to FIGS. 1-3, the mounting arrangement constructed in accordance with the present invention is indicated by the reference numeral 12. Mounting means 12 includes a head bracket 21 having longitudinal flanges 22 and 23. Bracket 21 has suitable holes for connection thereof to the tool bar 13 by U-bolts 24. A pair of transversely spaced longitudinally extending upper links 25 and 26 are pivotally connected at their first forward ends to upper portions of flanges 22 and 23 by suitable pivot fasteners 27, and at their second ends to upper portions of transversely spaced brackets 28 and 29, rigidly secured to frame 11, by suitable pivot fasteners 30.

A pair of transversely spaced longitudinally extending lower links 31 and 32 are pivotally connected at their first forward ends to lower portions of flanges 22 and 23 by suitable pivot fasteners 33 (one shown) and at their second ends to lower portions of brackets 28 and 29 by suitable pivot fasteners 34 (one shown). The above described conventional parallel linkage arrangement allows the furrow forming apparatus to follow the ground contour in operation for consistent furrow formation.

A pair of transversely spaced down pressure springs 35 and 36 provide the necessary biasing to the furrow forming apparatus to provide the required force to the disks 15 to properly penetrate the soil. The springs 35 and 36 preferably comprise tension coil springs, and respectively extend between corresponding brackets 37 (one shown), secured to a lower support channel member 38 rigidly connected between lower links 31 and 32, and an upper support channel member 39 extending between upper links 25 and 26. The brackets 37 extend in a generally longitudinal direction, and are preferably provided with a pair of longitudinally spaced openings, with the lower ends of springs 35 and 36 having hooked ends which are received in a selected one of the openings. The upper ends of springs 35 and 36 are suitably secured to upper support member 39.

In accordance with the present inventions, the respective ends of upper support member 39 can be removably attached along selected longitudinally spaced locations of upper links 25 and 26. Links 25 and 26 have longitudinally spaced openings 43 formed therein, which openings in link 25 are in transverse alignment with corresponding openings in link 26. Each end of upper support member 39 carries a connecting pin assembly 44 (FIG. 2), which includes a pin member 45 extending outwardly from the respective end of the support member 39 into a selected opening 43 to attach the support member to the links 25 and 26.

Each connecting pin assembly 44 includes a connecting pin 45 having a transverse portion 46, and a generally L-shaped handle portion 48. The handle portion 48 extends upwardly through a transverse, generally elongated slot 49 formed in upper support member 39 and is moveable between the respective ends of the slot. Transverse pin portion 46 has an inner end extending from the lower end of handle portion 48 and an outer end portion which extends through a selected opening 43. Each pin member 45 is transversely moveable between an extended, first or retaining position wherein the outer end of portion 46 extends outwardly of support member 39 and is received through an opening 43, and a second retracted position wherein the outer end of portion 46 is positioned generally within support member 39.

Each pin 45 is received in support member 39 in a manner which biases it towards its first or retaining position. Support member 39 is defined by an upper wall 51, a pair of spaced apart side walls 52, and end walls 53 (one shown). A transverse partition wall 54 extends between the side walls 52 parallel to each end wall 53 and spaced a short distance therefrom. Transverse portion 46 of pin 45 extends through transversely aligned openings formed in the respective end wall 53 and partition wall 54.

A compression coil spring member 55 is received about transverse portion 46 and is held in captive relation between a first washer member 56, received about transverse portion 46, and the partition wall 54. A suitable retaining pin is provided on transverse portion 46 between washer 56 and end wall 53 for contacting the washer to effect movement of the washer towards the partition wall 54 against the bias of spring 55 as the pin member 45 is moved from its extended first position toward its retracted second position. A second washer member 58 may be provided to be received about transverse portion 46 and positioned between spring 55 and position wall 54.

It will be quite apparent from the discussion of the operation of the mounting arrangement 12 which herein follows that an arrangement is provided which permits quick and easy adjustment of the up or down pressure applied by the springs 35, 36 to the parallel linkage.

When the upper ends of the springs 35 and 36 are spaced further from the upper link pivots about fasteners 27, compared to the spacing of the lower ends of springs 35 and 36 from the lower link pivots about fasteners 33, the parallel linkage is spring loaded downward, thus applying a downward force to the disks 15 to insure that they penetrate the soil. It can be appreciated that adjustment of the relative positions of the upper and lower ends of the springs 35, 36 is effective to increase or decrease the downward pressure applied by the springs to the parallel linkage. That is, as the upper ends of the springs are moved forward in relationship to the lower ends of the springs, the down pressure on the disks 15 is decreased. The relative positions of the upper and lower ends of the springs is dependent upon the location of upper support member 39 relative to links 25 and 26, the selection of the openings in brackets 37 on lower support 38 in which the lower hook ends of the springs extend through, and the position of lower support 38 between lower links 31, 32 (note the provision of spaced mounting openings in each of the lower links).

The desired down pressure on the disks 15 is achieved by selectively positioning the upper support member 39 along the length of links 25 and 26 by selecting the particular openings 43 through which the pin members 45 extend. In order to position the upper support member in its desired location, the operator grasps the handle portions 48 and moves the pins 45 into their second retracted positions against the bias of the springs 55. The upper support member 39 is then positioned between the selected, transversely aligned openings 43, and the handle portions 48 are released causing the pins 45 to move into their first positions with the ends of portion 46 extending through the selected openings 43. It can be appreciated that, in so doing, the down pressure exerted on the parallel linkage by the springs 35 and 36 can be adjusted in increments to achieve the required down pressure on the disks 15.

Should it be desired to exert an up pressure on the parallel linkage by the springs 35 and 36, the lower ends of the springs are positioned relatively rearwardly of the upper ends of the springs. This can readily be achieved by anchoring the springs in the rear slots in brackets 37 (FIG. 1), and by appropriate positioning of the upper support member 39 to allow the ends of portions 46 to protrude through holes 47 in the respective upper links 25, 26.

While the present invention has been described with reference to a preferred embodiment thereof, it will be understood that all of the equivalent forms or ramifications thereof are also contemplated. For example, it is contemplated that the springs 35 and 36 may be provided with means to selectively increase or decrease the pressure exerted by the springs. Moreover, the present disclosure is intended as an exemplification of the invention without limiting the invention to the specific embodiment disclosed herein. Various changes can be made without departing from the spirit or scope of the invention disclosed herein.

What is claimed is:

1. In a furrow forming apparatus for a seed planter having a frame adapted to be attached to a tool bar of a mobile power source and a furrow forming means rotatably mounted on said frame; an improved mounting means for securing said frame to said tool bar which permits selective adjustment of the downward or upward pressure applied to said furrow forming means; comprising:
   (a) a parallel linkage including a pair of transversely spaced longitudinally extending upper links pivotally secured at a first end to said tool bar and at a second end to said frame, and a pair of transversely spaced longitudinally extending lower links pivotally secured at a first end to said tool bar and at a second end to said frame, each of said upper links having a plurality of longitudinally spaced openings formed therein generally in transverse alignment with corresponding openings in the other of said upper links;
   (b) an upper support member transversely extending between said upper links;
   (c) a lower support member transversely extending between said lower links;
   (d) down pressure spring means having an upper end received by said lower support member for spring loading said parallel linkage; and
   (e) connecting pin members extending outward from the respective ends of said upper support member selectively movable between a first position extending into a selected one of said openings in said upper links, and a second retracted position withdrawn from said openings, wherein said upper support member is a channel-shaped member defined by an upper wall, a pair of spaced side walls and a pair of spaced end walls, and includes a pair of transverse partition walls extending between said side walls parallel to each of said end walls and each respectively spaced therefrom, with a spring means received about each of said connecting pin members between the respective partition wall and the respective end wall for biasing the pin members toward their first position, said connecting pin members being positioned between said side walls and extending through a respective opening formed in said end wall, said connecting pin members are formed with handle portions which extend upwardly through elongated slots formed in said upper wall to facilitate movement of said connecting pin members between their first and second positions, and each of said spring means is held in captive relation between first and second washer members received about the respective connecting pin member and its respective partition wall, and said connecting pin member is provided with retaining means in contact with said respective first washer member for movement thereof towards said respective partition wall against the bias of the spring means about the connecting pin member as the pin member is moved from its first position toward its second position.

* * * * *